Jan. 16, 1962 K. H. MEIER 3,017,545

DEVICE FOR MAGNETIC CLAMPING

Original Filed Nov. 8, 1954 5 Sheets-Sheet 1

INVENTOR.
KARL H. MEIER
BY
Wenderoth, Lind & Ponack,
Attys.

Jan. 16, 1962

K. H. MEIER 3,017,545

DEVICE FOR MAGNETIC CLAMPING

Original Filed Nov. 8, 1954

5 Sheets-Sheet 2

INVENTOR.
KARL H. MEIER
BY
Wenderoth, Lind & Ponack
Attys.

DEVICE FOR MAGNETIC CLAMPING

Original Filed Nov. 8, 1954

INVENTOR.
KARL H. MEIER
BY
Wenderoth, Lind & Ponack
Attys.

INVENTOR.
KARL H. MEIER
BY
Wenderoth, Lind + Ponack
Attys.

Jan. 16, 1962

K. H. MEIER 3,017,545

DEVICE FOR MAGNETIC CLAMPING

Original Filed Nov. 8, 1954

5 Sheets-Sheet 5

INVENTOR.
KARL H. MEIER
BY
Wenderoth, Lind & Ponack
Attys 3,017,545
Patented Jan. 16, 1962

3,017,545

DEVICE FOR MAGNETIC CLAMPING

Karl Heinrich Meier, Zurich, Switzerland, assignor to Alfred E. Herzer, Zurich, Switzerland Continuation of application Ser. No. 467,524, Nov. 8, 1954. This application May 27, 1960, Ser. No. 32,475
Claims priority, application Switzerland Aug. 12, 1954
17 Claims. (Cl. 317—159)

This application is a continuation of my application Serial No. 467,524 filed November 8, 1954 entitled "Device for Magnetic Clamping," and now abandoned.

Various magnetic clamping devices are known in which permanent magnets are used in place of electromagnets. These permanent magnets are so disposed between a bottom plate and a pole plate that by moving the magnets the holding flux of the pole plate can be turned on or off.

These known clamping devices suffer from the disadvantage that the magnet system exerts a relatively high pressure on the pole plate so that considerable force is often required for turning the magnets on or off. Further, this construction necessitates a certain amount of play as between the magnet system, the pole plate and the bottom plate, to make the displacement of the magnet system possible. The pole plate may be bowed to a certain extent when subjected to pressure, which limits the precision of the machining of the clamped parts.

Magnetic clamping devices have been used for other purposes than the clamping of parts to be machined. For instance, it has been proposed to provide printing plates with a magnetizable bottom layer to mount them on printing units of a printing press by means of magnetic clamping devices. Specifically, for the last mentioned purpose, it is necessary to provide clamping devices of small height but high holding capacity, especially for thin sheets. Further, the clamping device must be so constructed as to exclude any possibility of bending.

It has also been proposed to mount flexible, at least partially magnetizable, printing plates on the printing unit of a printing press by means of a magnetic cylinder. Such a magnetic cylinder must also have the above mentioned properties.

All known magnetic cylinders intended for the above purpose are energized electrically. Such magnetic cylinders suffer from the severe disadvantage that an interruption of the current may cause serious accidents. By reason of the high speed of the printing plates, the latter are thrown off the cylinder with great force when the holding magnetic force is turned off.

In general, magnetic clamping devices for parts to be machined have only a relatively small clamping surface, while the surfaces required for clamping printing plates must be many times greater. For instance, for rotogravure printing with copper, cylindrical surfaces up to two square meters are not infrequently required.

Clamping devices involving permanent magnets and magnetic cylinders having such surface dimensions cannot be made by known methods, since the forces required for moving the magnet systems are of such magnitude that they cannot be generated by known means. Further, the construction of a device having such a great surface is extremely expensive when all the requirements are met.

The above noted disadvantages are eliminated by the magnetic clamping device of the present invention.

The clamping device of the present invention includes a pole plate which may be deenergized by establishing a magnetic short circuit and flat permanent magnets having rounded poles which are oriented normally to their longitudinal axes. The clamping device is characterized by the fact that the diameter of the magnets is smaller than the diameter of the bores in the clamping device receiving these magnets; by the fact that the magnets are journalled concentrically in these bores by means of guides or connectors made of non-magnetic material in such a fashion that immediate contact of the magnets with any part of the bore walls is made impossible; and by the provision of means for rotating the magnets.

The method of making the clamping device of the present invention is characterized by the following steps: grooves or slots are formed in a ferromagnetic base body into which correspondingly shaped ferromagnetic parts are inserted; these parts are so connected with the base body by means of non-magnetic material that all contact of these parts with the base body is made impossible except for the supported surfaces of the parts; after said connection has been effected bores are formed in the base body, in parallelism and symmetrically with respect to the inserted parts, in such a fashion that a pole plate is formed having holding areas of alternating polarities magnetically isolated from each other, the holding poles of one polarity being formed by the base body itself.

The appended drawings show examples of various clamping devices according to the present invention, as well as various details thereof.

Figure 5:
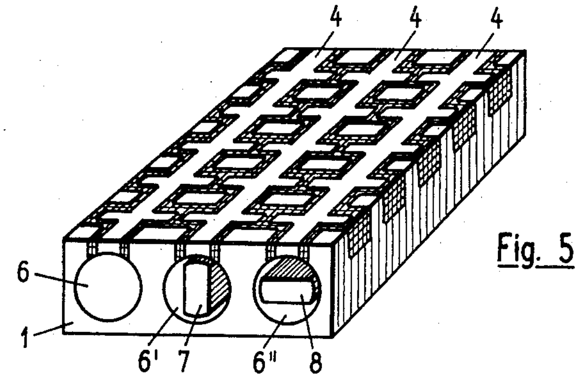
Figure 6:
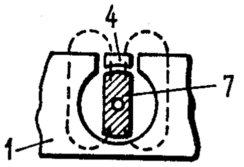
Figure 7:
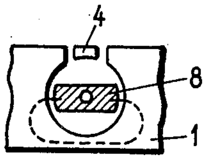
Figure 8:
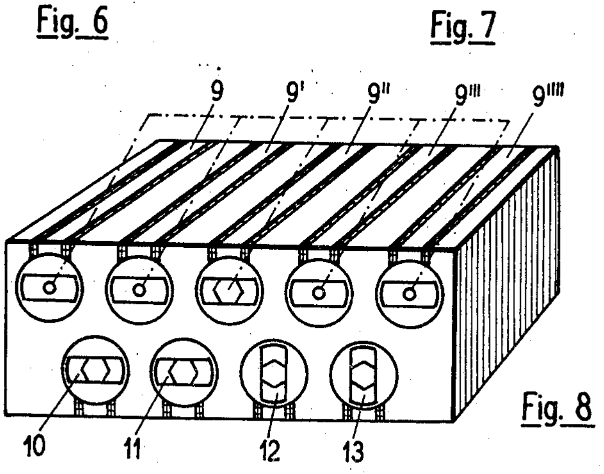
Figures 9, 10:
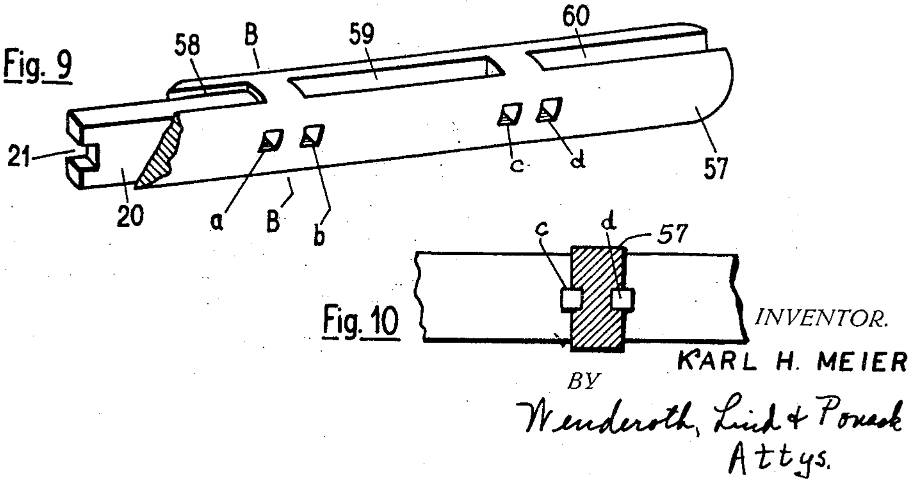
Figures 11, 12, 13, 14, 15, 16, 17:
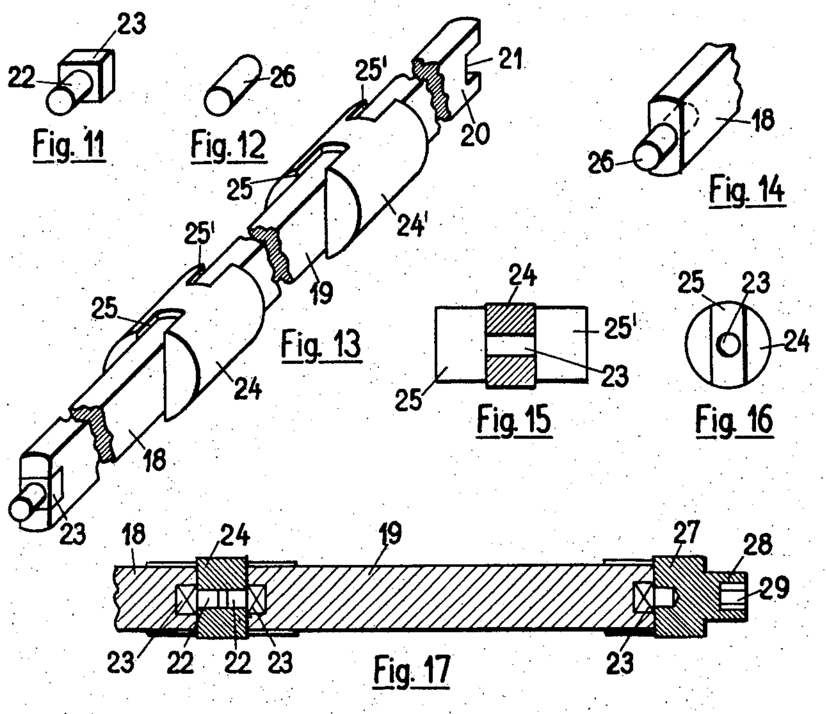
Figure 18:
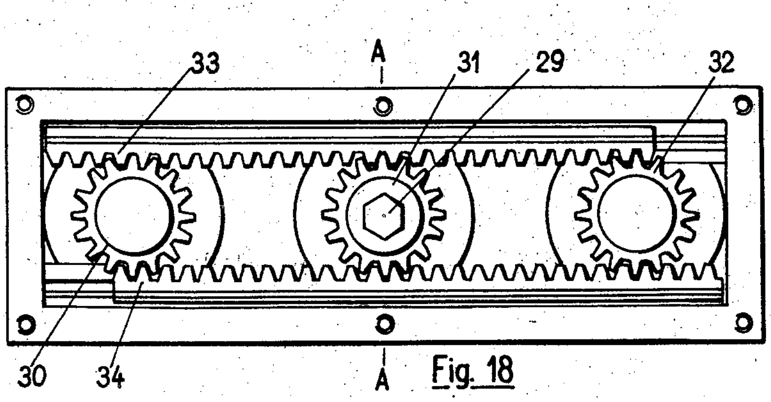
Figure 19:
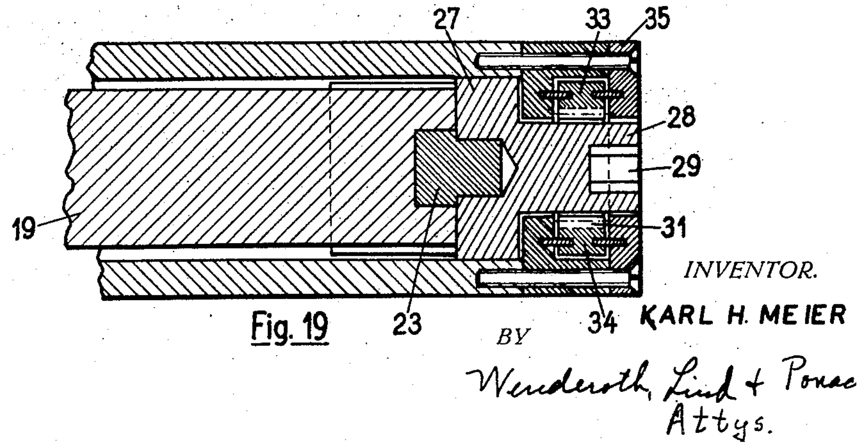
Figure 20:
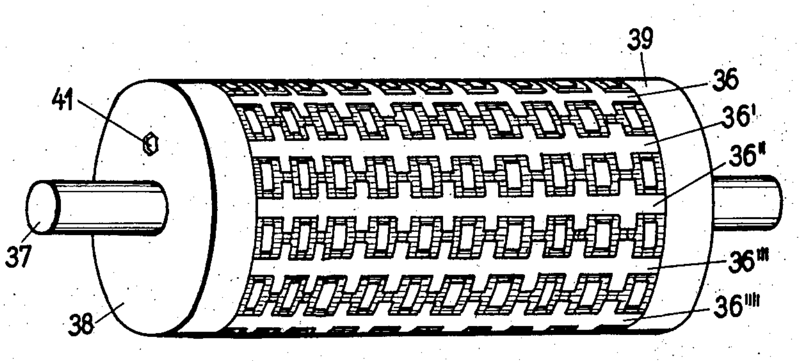
Figure 21:
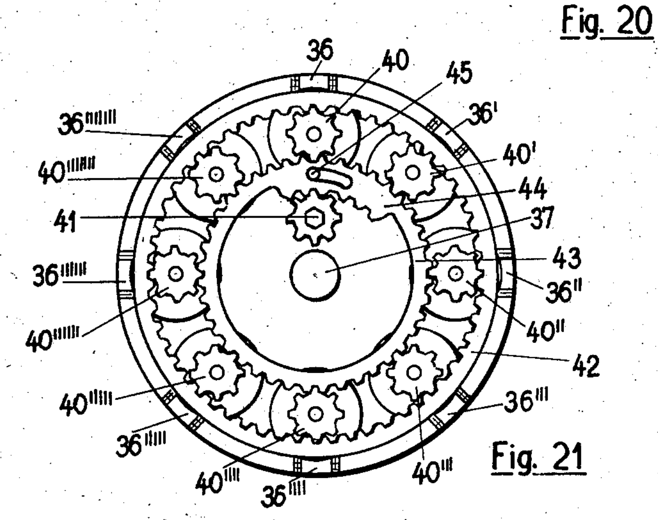
Figure 22:
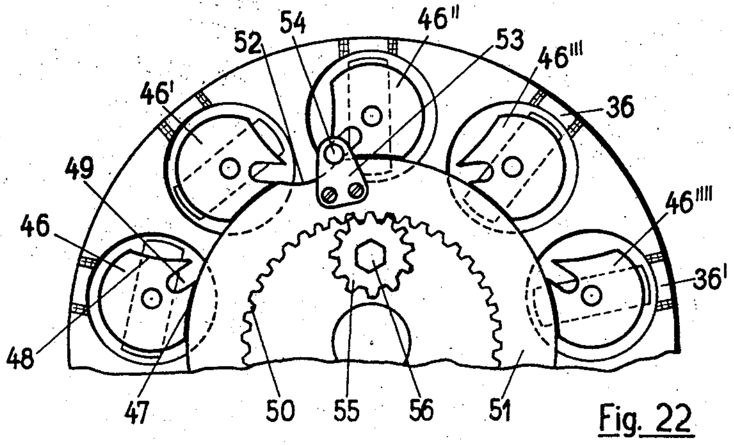
Figure 23:
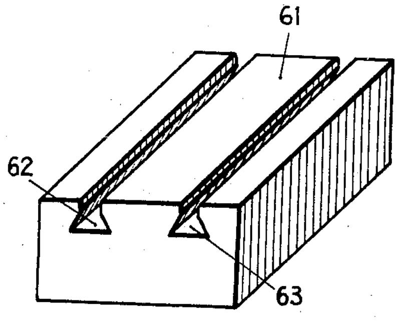
Figure 24:
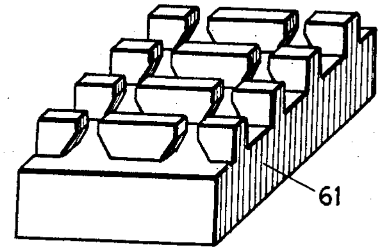
Figure 25:
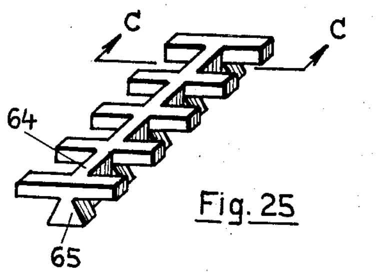
Figure 26:
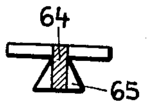

FIGURE 5 is a perspective view showing the base body with parts inserted and with non-magnetic material filling the space between the base body and said parts; the base body being shown with the bores for receiving the permanent magnets, one bore being empty, while the other two bores each hold one magnet, the magnet in the middle bore being positioned to energize one pole plate and the other magnet being positioned so as to deenergize the other pole plate;

FIGURE 6 shows the direction of the magnetic lines of force at an energized pole plate;

FIGURE 7 shows the direction of magnetic lines of force at a deenergized pole plate;

FIGURE 8 is a perspective view of a clamping device including two separate pole plates disposed opposite each other;

FIGURE 9 is a perspective view of a guide cylinder with apertures for receiving magnets;

FIGURE 10 is a longitudinal section taken along the line B—B in FIGURE 9;

FIGURE 11 is a perspective view showing a centering member for a permanent magnet;

FIGURE 12 is a perspective view of another centering member;

FIGURE 13 is a perspective view showing the coupling of several magnets by means of guide or centering members;

FIGURE 14 is a partial perspective view showing a centering device for a permanent magnet;

FIGURE 15 is a longitudinal section through a coupling member according to FIGURE 13;

FIGURE 16 is a front elevation of the member of FIGURE 15;

FIGURE 17 is a partial longitudinal section through a connecting device according to FIGURE 13;

FIGURE 18 is a front elevational view of a device for rotating the magnets to establishing and disestablishing holding magnetic flux in the pole surface of a magnetic cylinder;

FIGURE 19 is a section along the line A—A in the device of FIGURE 18;

FIGURE 20 is a perspective view of a magnetic cylinder for clamping magnetizable flexible printing plates;

FIGURE 21 is an end elevation of a device for moving the magnets for establishing and disestablishing holding magnetic flux in the pole surface of a magnetic cylinder;

FIGURE 22 is a partial end elevation of another device for establishing and disestablishing holding magnetic flux in the pole surface of a magnetic cylinder;

FIGURE 23 is a perspective view of another base body after the first machining step;

FIGURE 24 is a perspective view of the same base body after the second machining step;

FIGURE 25 is a perspective view of a comb-shaped pole part;

FIGURE 26 is a section taken along the line C—C in FIGURE 25; and

Figure 27:
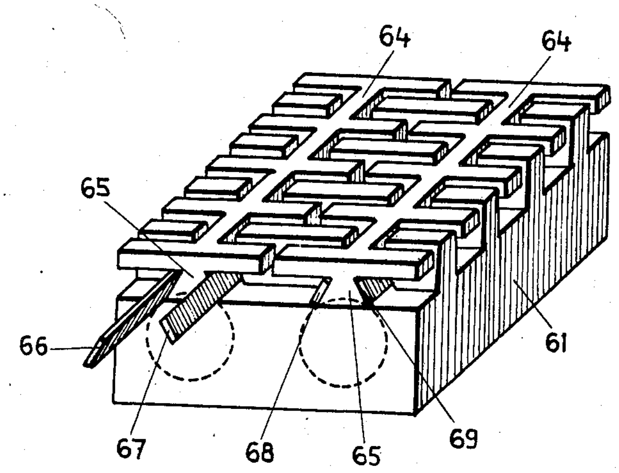

FIGURE 27 is a perspective view showing the base body after the insertion of the pole parts.

In the various views, similar reference characters indicate like parts.

Figure 1:
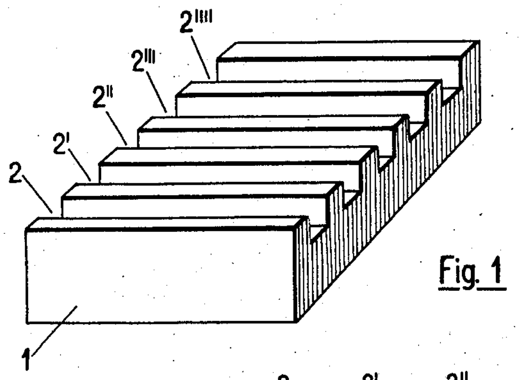
FIGURE 1 is a perspective view showing the ferromagnetic base body after the first machining step.

The base body 1 of FIGURE 1 consists preferably of soft steel or soft iron, if desired with an alloying addition such as cobalt. In this base body 1, there are formed, parallel to the longitudinal axis of the body, grooves or recesses 2 through 2'''', as by milling, planing or otherwise. The number of these recesses depends on the dimensions and the extent of subdivision of the clamping device.

Figure 2:
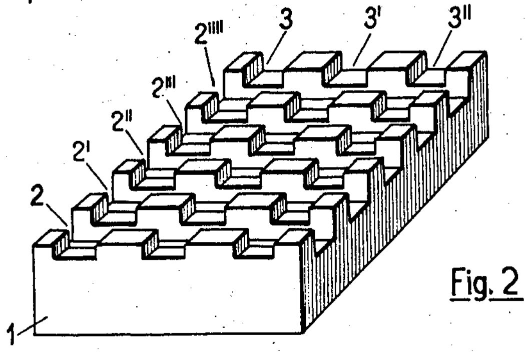
FIGURE 2 is a similar view showing the said base body after the second machining step.

In FIGURE 2 the same base body 1 is shown after the second machining step. Recesses 3 through 3'' are formed parallel to the major axis which are less deep than the recesses oriented normally thereto.

Figure 3:
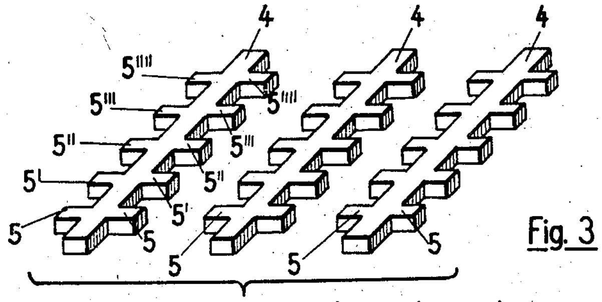
FIGURE 3 shows, in perspective, examples of ferromagnetic parts for insertion in the base body.

FIGURE 3 shows three similar insert parts. These parts consist of a flat bar 4 with lateral teeth 5 through 5'''' arranged in comb fashion and projecting symmetrically from the bar to the right and to the left. These three parts, together with the above described base body, form the pole plate of the clamping device. The thickness of these parts corresponds to the depth of the recesses extending parallel to the major axis, while the other dimensions are such that, with exception of the supported surface, all contact of these parts with the base body is impossible.

Figure 4:
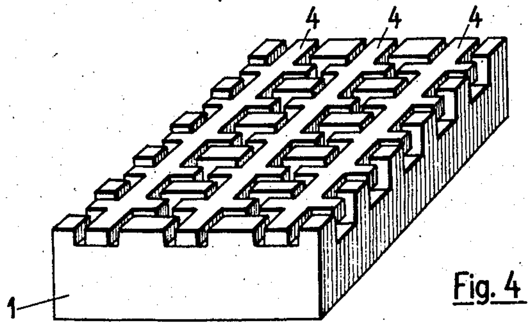
FIGURE 4 is a perspective view showing the base body with parts according to FIGURE 3 inserted.

FIGURE 4 is a view showing the base body 1 after insertion of the parts 4. The empty spaces in the recesses are filled with a non-magnetic material, for instance, soft solder, synthetic resin or the like, whereby these parts are also fixedly connected to the base body.

In the clamping thus made pole borings 6 through 6'' are formed parallel to and symmetrical with respect to the longitudinal axis, for receiving the permanent magnets. The thickness of the inserted parts 4 is predetermined so that they form a part of the bore wall.

FIGURE 5 shows the base body with the inserted parts after formation of the bores 6' through 6''. While the first pole bore still is empty, energizing magnets 7 and 8 are provided in the other pole bores. On vertical positioning of the magnet 7 the holding magnetic flux for this area of the pole plate is established, while on horizontal positioning of the magnet 8 this flux extends exclusively within the base body whereby this part of the pole plate is deenergized, the attractive poles of one magnetic polarity being formed by the base body.

The direction of the magnetic lines of force is shown specifically in FIGURE 6 for an energized pole plate and in FIGURE 7 for a deenergized pole plate.

FIGURE 8 shows, by way of an example, another clamping device according to the present invention. This device differs somewhat from that described herein above. Thus, by way of example, the inserted parts 9 through 9'''' take the form of straight bars. Grooves or recesses oriented only in a single direction are therefore formed in the base body in which these flat bars are inserted. With the exception of their supported surfaces, the inserted parts are connected, without contact, with the base body by means of a non-magnetic material. After the pole bores have been formed, the inserted parts, which are magnetically isolated from the base body, form part of the bore walls.

Further, this example of a device according to the present invention includes two separate, independent and oppositely oriented clamping surfaces, which are each energized by its own magnet system. The lower clamping surface energized by magnets 10 through 13, which preferably are individually adjustable, and serves for clamping the device magnetically on the machine tool, while the upper clamping surface serves to hold a part to be machined.

By means of the above mentioned guide members the magnets may easily be moved in the pole bores.

In general, journalling the magnets at their ends is sufficient for small clamping devices. When the clamping devices are longer it is advantageous to use several short magnet parts in each pole bore and to prevent deflection of the magnets by insertion of guide and connecting members. Such deflection of long magnets is caused by the attractive forces set up between the magnet poles and the bore walls.

From the machining standpoint it is also preferable to use several magnets coupled together, since a limited magnet length cannot be exceeded in machining.

FIGURE 13 shows, in perspective, several magnets coupled together. The flat magnets 18, 19 and 20, the poles of which are oriented normally to the longitudinal axes of the magnets and which are correspondingly rounded, are formed at their ends with recesses 21 which serve to receive centering members. Such a centering member is shown in FIGURE 11, by way of an example. A prismatic head 23 is dimensioned so as to fit, without any play, in the correspondingly shaped recesses 21 of the magnet 20. This head is provided with a pin 22 which projects into a centering bore 23 (see FIGURE 15) of a coupling member 24 or 24' whereby the magnet is held concentrically in the coupling member. This coupling part, which is shown in FIGURE 15 in longitudinal section and in FIGURE 16 in front elevation, consists of a cylinder formed at its two ends, respectively, with radial slots 25 and 25' of such width that the flat magnets fit therein without play. The diameter of the cylinder is somewhat greater than pole diameter of the magnets but is equal to the diameter of the pole bore. Thus direct contact of the magnet poles with the pole bore is prevented. All these guide and coupling members are made of non-magnetic material.

In place of the centering member of FIGURE 11 a centering cylinder 26, as shown in FIGURE 12, can be used. In this case, corresponding bores are formed at the ends of the magnets, as shown, for instance, in FIGURE 14. A centering pin 26 projects into the bore 23 of the coupling part of FIGURE 15 or 16.

In the case of short clamping devices, where only one magnet is used for each pole bore, guide members are attached to both ends of the magnet, by means of which the magnets are concentrically guided in the pole bores, similarly to the coupling members. Such guide members are also attached, when several magnets are coupled together, to the two outermost magnet ends. A magnet arrangement with one coupling member and one guide member is shown in FIGURE 17 in longitudinal section. The magnets 18 and 19 are connected together by the couple member 24 as described herein above, while the guide member 27 of the magnet 19, the centering arrangement of which corresponds to that of the coupling member 24, is formed with a cylindrical projection 28 which fits in a bore in a journal plate covering the pole bores of the clamping device. The guide member 27 is also formed with a recess 29 serving to receive a tool for rotating the magnets to establish or disestablish the magnetic flux.

In place of guide and coupling members, guide cylinders may be used to hold the individual magnets in the pole bores. These cylinders are formed with appropriately shaped apertures for receiving the magnets.

An example of such a guide cylinder is shown in FIGURE 9, and FIGURE 10 is a longitudinal section along the line B—B of FIGURE 9. The guide cylinder is made of non-magnetic material and is formed with radial, slot-shaped apertures 58, 59 and 60 arranged symmetrically with respect to the longitudinal axis of the cylinder. The cylinder shown in the drawing is intended for the reception of only three magnets. However, it can be modified for receiving any other desired number of magnets. The ends of this guide cylinder are broken off in the drawing but correspond in shape to that of the guide and coupling members.

The magnet 20 inserted in the aperture 58 is formed with a recess 21 which serves to receive a centering member. A similar recess is also formed in the part of the magnet not visible in the drawing. The guide cylinder 57 is formed at both ends of each of the apertures 58, 59 and 60 with bores *a*, *b*, *c* and *d* of rectangular cross sectional form and oriented normally to the apertures 58, 59 and 60. These bores serve to receive correspondingly shaped centering rods, which fix the magnets in the cylinder apertures. Of course, these bores may also be round. In this case, the diameter of the centering rods is equal to the width of the magnet apertures 21.

In general, it is desirable that all magnets are moved simultaneously by the control mechanism. Such a control device is shown partially and diagrammatically in FIGURE 18 and in FIGURE 19 in section along the line A—A of FIGURE 18.

A gear wheel 31 made of non-magnetic material is mounted on the projection 28 of the guide member 27 (FIGURE 19). This gear wheel meshes with two racks 33 and 34 which are also made of non-magnetic material. Gear wheels 30 and 31 connected with the guide members of the other magnets also mesh with these racks. On rotation of the magnets and movement of the gear wheels 31 connected therewith, the racks move the other gear wheels so that the corresponding magnets are also rotated.

FIGURE 19 shows a section along the line A—A of FIGURE 18. The above noted racks move in correspondingly shaped guide members made of non-magnetic material which are bolted on the base body through a cover member 35 also made of non-magnetic material. On rotation of the gear wheel 31 both racks are moved so as to finally engage a stop. The length of the racks is adjusted so that they permit rotation of the magnets through an angle of about 90°. In the case of very long clamping devices it may be advantageous to provide control devices at both ends of the base body.

FIGURE 20 shows a magnetic cylinder for clamping magnetizable flexible printing plates. The pole distribution over the surface of the magnetic cylinder is the same as that shown in FIGURE 5. In the integral metal cylinder, which here is substituted for the base body, axial as well as radial groove-like recesses are formed, in which, as in the clamping devices of FIGURES 1 through 5, ferromagnetic parts 36 through 36'''' are inserted. These parts are provided with comb-like teeth, as previously shown in FIGURE 3, and are connected to the rotary base body of the magnet cylinder by non-magnetic material.

Since the inserted parts are flat, they project partially above the cylinder surface.

These parts may be removed down to the cylinder surface by grinding or shaping in a lathe.

In these magnetic cylinders, too, the radial and axial recesses are of different depths. In other respects, the method of fabricating this magnetic cylinder is identical with the above described examples of making the clamping devices according to FIGURES 1 through 5.

Likewise, pole bores are formed in the rotary body symmetrically and parallel to the longitudinal axis of this body after the parts 36 through 36'''' have been inserted. Magnets are inserted into these pole bores, as described.

The magnetic cylinder is mounted on a shaft 37. Two flanges 38 and 39 close the ends of the cylinder. The devices for rotating the magnets are housed within these flanges which are made of non-magnetic material such as brass, non-magnetic stainless steel or other suitable material. An example of such a device for moving the magnets is shown in FIGURE 21. In this device gear wheels are fixedly mounted on the guide members of the magnets which correspond to the form shown in FIGURE 17. These gear wheels 40 through 40'''' mesh with a fixed ring gear 42. A gear wheel 43 is mounted concentrically to the cylinder shaft 37 and is provided with a gear segment 44. This gear wheel likewise meshes with the magnet gear wheels 40 through 40''''.

On rotation of an adjusting pinion 41, which meshes with the gear segment 44, all the magnets in the cylinder are rotated simultaneously. A stop device 45 limits the angle of rotation of the gear wheel 43. This angle is so adjusted that rotation of the magnets through an angle of about 90° is made possible.

Thin, flexible printing plates, which, for instance, for rotogravure printing, may consist of copper plated steel sheets, can only rarely be clamped completely evenly on the magnetic cylinder by simultaneous establishment of the total attractive magnetic flux. This because the sheet is at once attracted magnetically at all areas of contact when being clamped, so that because of the frictional resistance caused by the attractive force uneven spots are smoothed out only with difficulty, as when air is trapped between the cylinder and the sheet, or when tensions causes limited deformation of the sheet.

This disadvantage may be eliminated by another device of the present invention which provides for stepwise establishment of the attractive magnetic flux. A partial view of such a device is shown in FIGURE 22 in which the attractive zones of the individual magnets are established one after the other. For simplifying the drawing all parts not required for understanding the principle of operation have been omitted.

In this device, so called Maltese wheels 46 through 46'''' are attached to the individual magnet guide members in place of the gear wheels 40 through 40'''' of FIGURE 21. These Maltese wheels are provided with two stop areas 47 and 48 and also with an actuating groove 49 for receiving a driving pin 54 of a control device 53. A control wheel 51 provided with gear teeth 50 is mounted concentrically on the cylinder shaft. This control wheel is formed with rounded recesses 52 having a diameter corresponding to the radius of curvature of the Maltese wheels, to make rotation of this wheel possible when the control device is operated.

A gear wheel 55 meshes with the gearing 50 of the wheel 51 and is formed with a recess 56 for receiving an actuating tool. On clockwise rotation of the control wheel 51 all the magnets are rotated, one after the other. After a complete rotation of this wheel is brought to a stop when the pin 54 comes to rest on the rear side of the Maltese wheel. On rotation in the opposite direction, the magnets are again rotated, one after the other, and after complete rotation, i.e. when all the magnets have been reoriented, brought to a stop.

In a further form of the present invention, attachment of the pole bars to the base is facilitated by forming the base recesses formed parallel to the magnetic axis and also the middle bar of the comb-like pole bars with a dovetailed cross section. The dovetailed middle bar is made smaller than the corresponding base recess. After insertion of the pole bars into the base these parts are fixedly connected together by two strips made of non-magnetic material inserted into the space between the parts.

Such a device is shown in FIGURES 23 to 27.

A base 61 shown in FIGURE 23 is formed with two dovetailed recesses 62 and 63. The number of these recesses is given only by way of an example and can be varied according to the size of the clamping device. Similarly shaped recesses and the general arrangement for a clamping device disclosed herein below can also be adapted for a magnetic cylinder.

FIGURE 24 shows the base 21 after a second machining step. The transverse recesses have the same length as the axial recesses.

FIG. 25 shows a pole bar with teeth arranged in comb-like fashion to project from the left and the right sides of a middle bar 64. A cross section of this pole bar taken along the line C—C of FIGURE 25 is shown in FIGURE 26. The middle bar 64 is provided with a depending part 65 of dovetailed cross sectional form. Between the individual teeth the middle bar has the same width throughout its whole cross section, as shown in FIGURE 27.

As mentioned above, the dovetail shaped part of the middle bar is smaller than the corresponding recess in the base, so that when the pole parts 65 are inserted in the body 61 space is left between the parts into which strips 66, 67, 68 and 69 are inserted. Thereby the pole bars are connected fixedly to the base 61. The remaining space is filled with a non-magnetic material.

From the foregoing description the invention and its advantages will be readily understood. It is apparent that various changes may be made in the methods and in the form, construction and arrangement of the parts without departing from the spirit and scope of the invention and without sacrificing its advantages, the forms hereinbefore described and illustrated in the drawings being merely preferred embodiments of the invention.

I claim:

1. Magnetic clamping device for the clamping of work-parts, especially magnetizable printing-form carriers to the printing mechanism of printing presses, comprising a cylindrical ferromagnetic base body having a generated surface forming a magnetic clamping surface, said base body having ferromagnetic parts located below said clamping surface, said base body having enclosed borings therein, a plurality of rod-shaped exciting magnets having two narrow sides and magnetized perpendicularly to their longitudinal axes with magnet poles on said narrow sides mounted below said magnetic clamping surface in said borings, said exciting magnets being rotatable around their longitudinal axes that extend parallel to said clamping surface, a plurality of channels in said body extending between said clamping surface and said borings and parallel to the axis of rotation of said magnets and an elongated pole-piece in each channel connected to said base body by non-magnetizable material whereby in switched-on-position one pole of all magnets faces its pole-piece so that the magnetic lines of flux emerge beyond said clamping surface and in switched-off position perpendicular thereto the magnet poles are shortcircuited by said ferromagnetic parts.

2. Magnetic clamping device as set forth in claim 1, wherein there are provided additional channels extending concentrically and intersecting said first-named channels approximately perpendicularly, said first-named and said additional channels having different depths.

3. Magnetic clamping device as set forth in claim 1, wherein said channels and said pole-pieces have a dovetail-shaped cross-section and in the intervals between are inserted non-magnetizable strips for holding said pole-pieces in said channels, and the remaining interstices are filled up by a non-magnetizable material.

4. Magnetic clamping device as set forth in claim 1 wherein means are provided for moving said magnets to the switched on and switched off positions.

5. Magnetic clamping device as set forth in claim 1 wherein means are provided for moving said magnets individually successively to the switched on and switched off positions.

6. Magnetic clamping device as set forth in claim 1 wherein means are provided for moving said magnets individually successively and automatically to the switched on and switched off positions.

7. Magnetic clamping device as set forth in claim 1 wherein means are provided for moving said magnets to the switched on and switched off positions comprising Maltese wheels correlated with the individual magnets so that said magnets may be switched successively.

8. Magnetic clamping device as set forth in claim 1 wherein means are provided for moving said magnets comprising a gear wheel fixed to each magnet and a rack cooperating with said gear wheels so that said magnets may be moved simultaneously.

9. Magnetic clamping device for the clamping of work-parts, especially magnetizable printing-form carriers to the printing mechanism of printing presses, comprising a cylindrical base body having a clamping surface formed with a plurality of borings extending therein parallel to said clamping surface and with a plurality of channels in said body extending between said clamping surface and said borings, said base body having ferromagnetic parts located below said clamping surface, a plurality of rod-shaped exciting magnets having two narrow sides and magnetized perpendicularly to their longitudinal axes mounted below said magnetic clamping surface in said borings, said exciting magnets being rotatable around their longitudinal axes that extend parallel to said clamping surface, and an elongated pole-piece in each channel connected to said base body by non-magnetizable material whereby in switched-on-postion one pole of all magnets faces its pole-piece so that the magnetic lines of force emerge beyond said clamping surface and in switched-off position perpendicular thereto the magnet poles are short circuited by said ferromagnetic parts.

10. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, a plurality of channels in said body extending between said clamping surface and said borings and parallel to the axis of rotation of said magnets and an elongated pole-piece in each channel connected to said base body by non-magnetizable material whereby in switched-on-position one pole of all magnets faces its pole-piece so that the magnetic lines of flux emerge beyond said clamping surface and in switched-off position perpendicular thereto the magnet poles are short-circuited by said ferromagnetic parts.

11. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, a plurality of channels in said body extending between said clamping surface and said borings and parallel to the axis of rotation of said magnets, additional channels extending concentrically and intersecting said first-named channels approximately perpendicularly, said first-named and said additional channels having different depths and an elongated pole-piece in each of said first named channels connected to said base body by non-magnetizable material whereby in switched-on-position one pole of all magnets faces its pole-piece so that the magnetic lines of flux emerge beyond said clamping surface and in switched-off position perpednicular thereto the magnet poles are shortcircuited by said ferromagnetic parts.

12. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, a plurality of channels in said body extending between said clamping surface and said borings and parallel to the axis of rotation of said magnets and an elongated pole-piece in each channel connected to said base body by non-magnetizable material, said channels and said pole-pieces having a dovetail-shaped cross-section and in the intervals between are inserted non-magnetizable strips for holding said pole-pieces in said channels, and the remaining interstices are filled up by a non-magnetizable material, whereby in switched-on-position one pole of all magnets faces its pole-piece so that the magnetic lines of flux emerge beyond said clamping surface and in switched-off position perpendicular thereto the magnet poles are shortcircuited by said ferromagnetic parts.

13. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, means for moving said magnets to the switched-on and switched-off positions, a plurality of channels in said body extending between said clamping surface and said borings and parallel to the axis of rotation of said magnets and an elongated pole-piece in each channel connected to said base body by non-magnetizable material whereby in switched-on-position one pole of all magnets faces its pole-piece so that the magnetic lines of flux emerge beyond said clamping surface and in switched-off position perpendicular thereto the magnet poles are shortcircuited by said ferromagnetic parts.

14. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, means for moving said magnets individually successively to the switched-on and switched-off positions, a plurality of channels in said body extending between said clamping surface and said borings and parallel to the axis of rotation of said magnets and an elongated pole-piece in each channel connected to said base body by non-magnetizable material whereby in switched-on-position one pole of all magnets faces its pole-piece so that the magnetic lines of flux emerge beyond said clamping surface and in switched-off position perpendicular thereto the magnet poles are shortcircuited by said ferromagnetic parts.

15. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, means for moving said magnets individually successively and automatically to the switched on and switched off positions, a plurality of channels in said body extending between said clamping surface and said borings and parallel to the axis of rotation of said magnets and an elongated pole-piece in each channel connected to said base body by non-magnetizable material whereby in switched-on-position one pole of all magnets faces its pole-piece so that the magnetic lines of flux emerge beyond said clamping surface and in switched-off position perpendicular thereto the magnet poles are shortcircuited by said ferromagnetic parts.

16. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, means for moving said magnets to the switched-on and switched-off positions comprising Maltese wheels correlated with the individual magnets so that said magnets may be switched successively, a plurality of channels in said body extending between said clamping surface and said borings and parallel to the axis of rotation of said magnets and an elongated pole-piece in each channel connected to said base body by non-magnetizable material whereby in switched-on-position one pole of all magnets faces its pole-piece so that the magnetic lines of flux emerge beyond said clamping surface and in switched-off position perpendicular thereto the magnet poles are shortcircuited by said fearomagnetic parts.

17. Magnetic clamping device for the clamping of work-parts, especially magnetizable printing-form carriers to the printing mechanism of printing presses, comprising a cylindrical ferromagnetic base body having a magnetic clamping surface, said base body having borings therein, a plurality of rod-shaped exciting magnets magnetized perpendicularly to their longitudinal axes with magnet poles oppositely disposed mounted below said magnetic clamping surface in said borings, said exciting magnets being rotatable around their longitudinal axes that extend parallel to said clamping surface, means for moving said magnets comprising a gear wheel fixed to each magnet and a rack cooperating with said gear wheels so that said magnets may be moved simultaneously, a plurality of channels in said body extending between said clamping surface and said borings and parallel to the axis of rotation of said magnets and an elongated pole-piece in each channel connected to said base body by non-magnetizable material whereby in switched-on-position one pole of all magnets faces its pole-piece so that the magnetic lines of flux emerge beyond said clamping surface and in switched-off position perpendicular thereto the magnet poles are shortcircuited by said ferromagnetic parts.

(References on following page)

References Cited in the file of this patent

UNITED STATES PATENTS

| | | |
|---|---|---|
| 1,017,031 | Wingaard | Feb. 13, 1912 |
| 1,775,981 | Warner | Sept. 16, 1930 |
| 2,209,558 | Bing | July 30, 1940 |
| 2,243,616 | Bing | May 27, 1941 |
| 2,404,072 | Karasick | July 16, 1946 |
| 2,435,737 | Carson | Feb. 10, 1948 |
| 2,471,067 | Hitchcock | May 24, 1949 |
| 2,580,099 | Jaeger | Dec. 25, 1951 |
| 2,609,430 | Bower | Sept. 2, 1952 |
| 2,648,434 | Russell | Aug. 11, 1953 |
| 2,771,571 | Carson | Nov. 20, 1956 |

FOREIGN PATENTS

| | | |
|---|---|---|
| 551,329 | Great Britain | Feb. 17, 1943 |
| 632,933 | Great Britain | Dec. 5, 1949 |